United States Patent [19]

Barton et al.

[11] 4,431,995
[45] Feb. 14, 1984

[54] PHASED ARRAY SIGNAL PROCESSING

[75] Inventors: Paul Barton, Bishop's Stortford; Peter K. Blair, Harlow; William D. Waddoup, Sawbridgeworth, all of England

[73] Assignee: International Standard Electric Corporation, New York, N.Y.

[21] Appl. No.: 245,504

[22] Filed: Mar. 19, 1981

[30] Foreign Application Priority Data

Mar. 26, 1980 [GB] United Kingdom ............... 8010173

[51] Int. Cl.³ .............................................. H04B 7/00
[52] U.S. Cl. .................................... 343/373; 343/379
[58] Field of Search ............. 343/100 LE, 117 A, 7 A

[56] References Cited

U.S. PATENT DOCUMENTS 4,034,376  7/1977  Barton .............................. 343/16 R Primary Examiner—Theodore M. Blum
Attorney, Agent, or Firm—T. E. Kristofferson; W. T. O'Neil

[57] ABSTRACT

A phased array radar system, such as may be used in a low-angle tracking radar or direction finding equipment, includes a multi-channel digital filter to remove unwanted multipath signals. The R.F. signals from the array are first converted to zero I.F. and digitized. After n-channel Doppler filtering (13) the digital signals are subjected to filtering (14) either to effect band-pass spatial filtering, thereby attenuating generally all signals arriving outside preset angular limits, or notch filtering which heavily attenuates signals arriving from one particular angle. In one embodiment spatial filtering is followed by notch filtering. The filtered signals are then beam-formed (15) before being applied to further digital processing, such as beam peak tracking (16).

8 Claims, 14 Drawing Figures

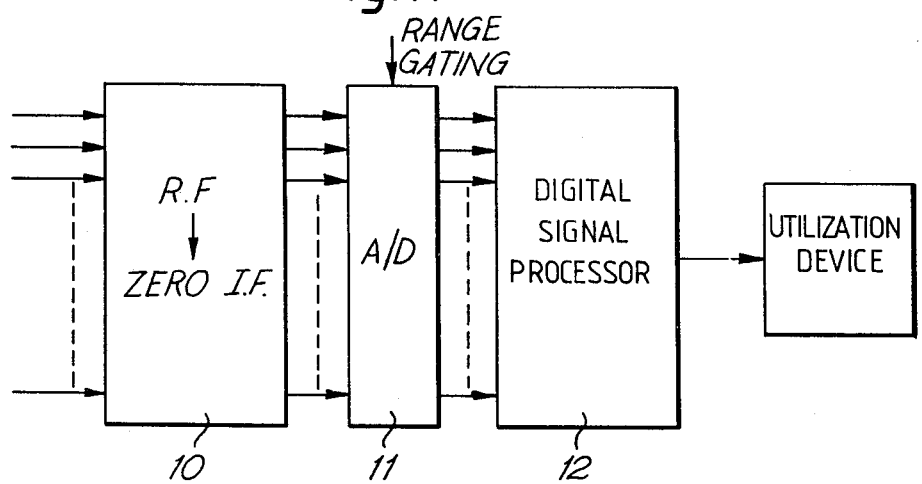
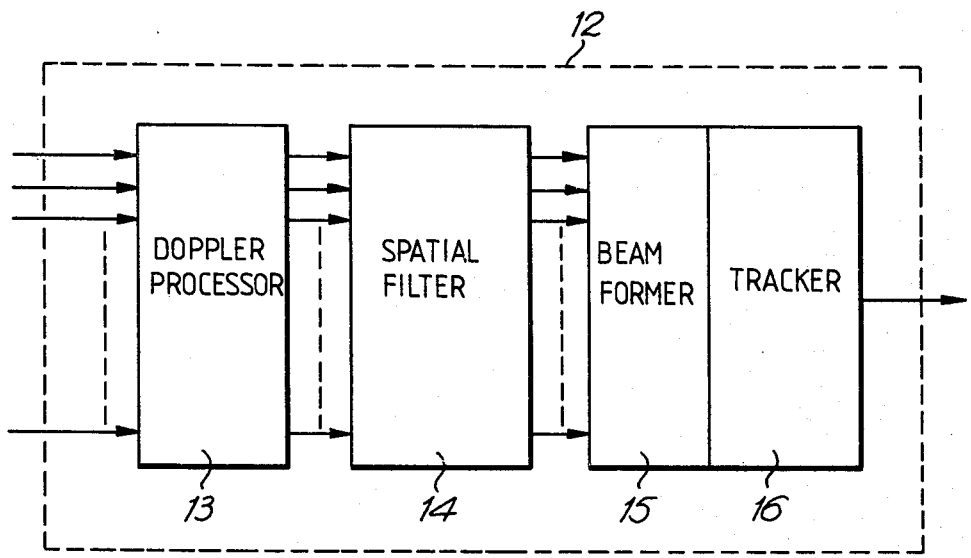

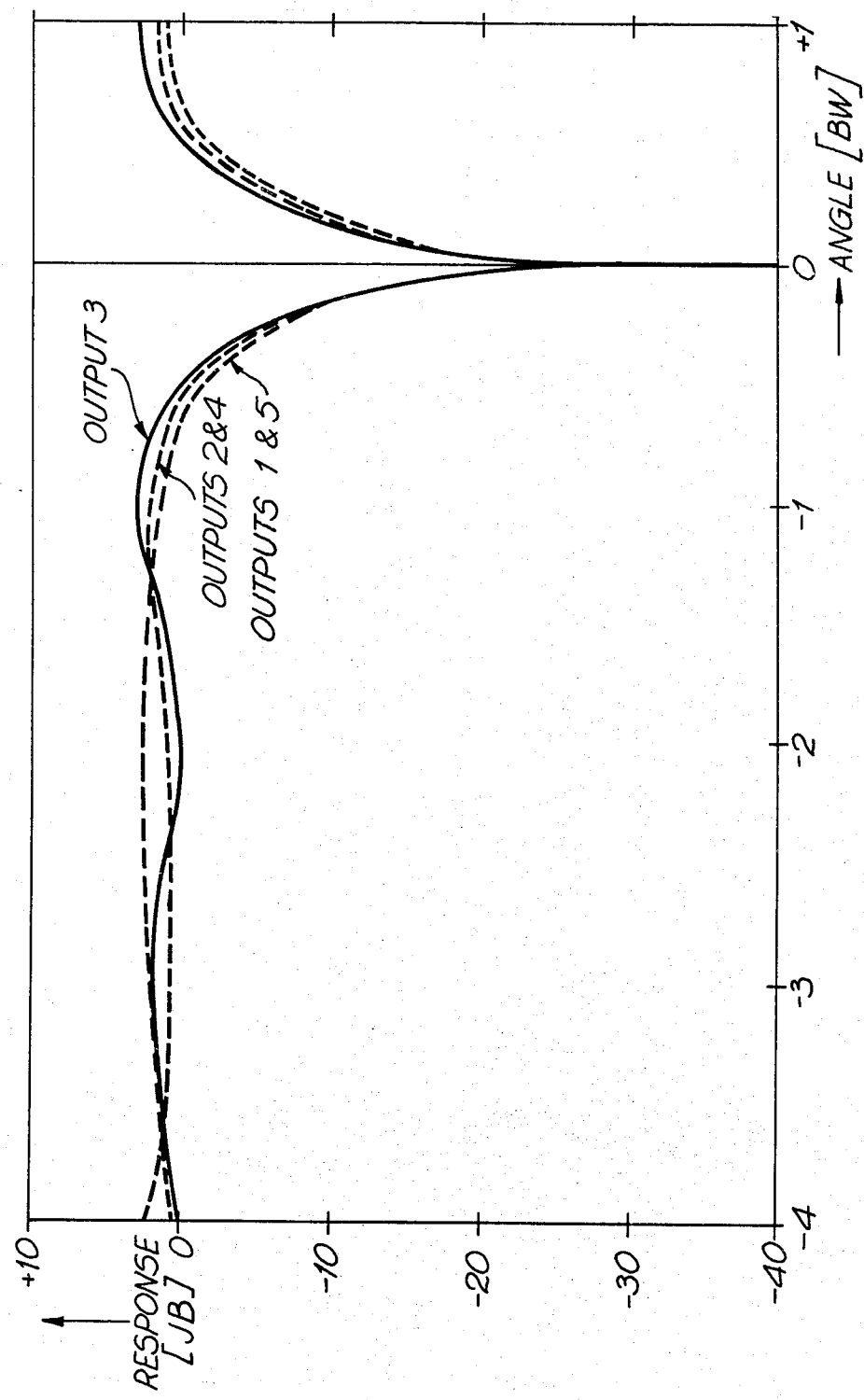

PHASED ARRAY SIGNAL PROCESSING

BACKGROUND OF THE INVENTION

1. Field of the Invention

The invention relates to phased array antenna systems with signal processing, such as used in radar or direction finding equipments.

2. Description of the Prior Art

In prior art radar systems a major problem concerns removal of signals from unwanted directions of arrival, while leaving signals from desired directions largely unaffected for subsequent signal processing. This problem is not confined to phased array systems and also occurs with mechanically steered dish antennas. For example, British Pat. No. 1,508,952 (and the corresponding U.S. Pat. No. 4,060,807) describe the problem in detail for a low-angle tracking radar using a parabolic dish antenna and discloses a form of what may be termed "spatial filtering" to overcome the problem.

Notwithstanding the prior art approaches to the problem, a substantial need remains for more effective angular (spatial) filtering. The manner in which the invention addresses the problem and, provides a novel solution, will be understood at this description proceeds.

SUMMARY OF THE INVENTION

The invention utilizes array signal processing (ASP) techniques to discriminate in favor of direct signals and against multipath signals. ASP is known per se, and the manner of its application to radar systems is described in U.S. Pat. No. 4,034,376 and elsewhere in the technical literature.

According to the present invention there is provided a phased array system including means for converting multi-channel analog information signals with zero intermediate frequency to digital representations thereof, multi-channel digital filtering means to obtain angular discrimination wherein filtering is implemented in parallel on all the channels by a matrix operation according to one or more predetermined algorithms yielding a plurality of outputs each with a different effective phase center spanning substantially the original extent of the antenna aperture, beam-forming means to which said outputs are applied, and signal processing means to which the outputs of the beam-forming means are applied.

By way of example, one application—that of low-angle radar tracking—will be described where ASP is used in the elevation plane to discriminate in favor of the direct signal and against the multipath signal whose incursion into the main beam would otherwise cause tracking instability. Digital signal processing is assumed to be provided on selected range-gates in the radar receiving mode.

BRIEF DESCRIPTION OF THE DRAWINGS

FIG. 1 illustrates a basic receiver system according to the invention.

FIG. 2 illustrates the basic functions to be performed in the digital signal processor of FIG. 1.

FIG. 5 illustrates angular responses of a spatial filter matrix with notch pattern synthesis.

DETAILED DESCRIPTION OF THE PREFERRED EMBODIMENT

Figure 3A:
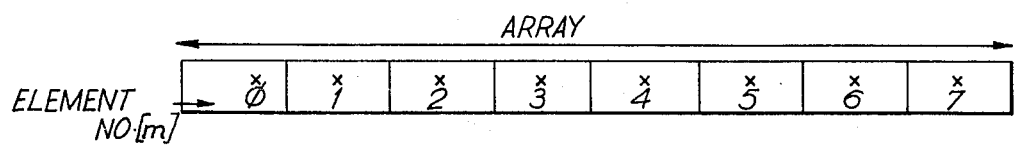
FIGS. 3A–3F illustrate weightings for a rectangular band-pass spatial filter centered at antenna boresight.
Figure 3B:
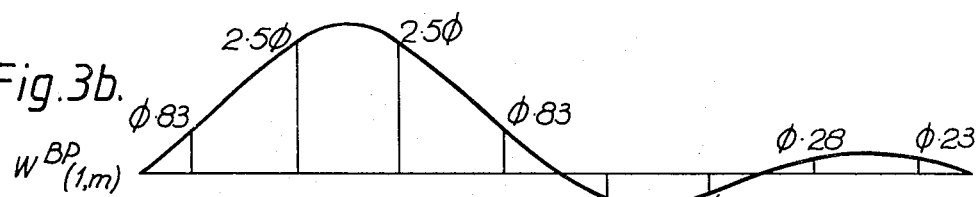
Figure 3C:
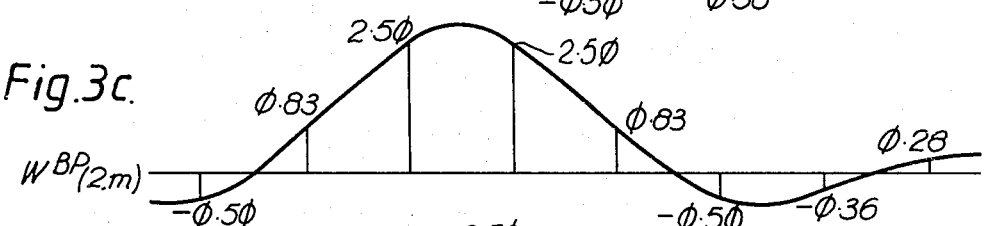
Figure 3D:
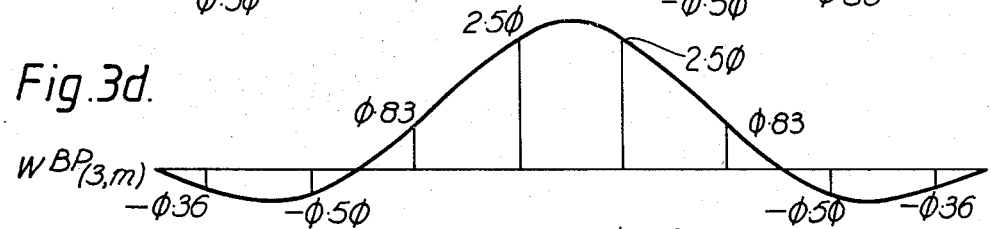
Figure 3E:
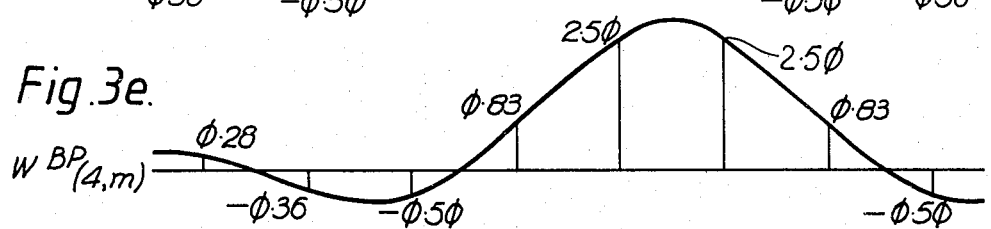
Figure 3F:
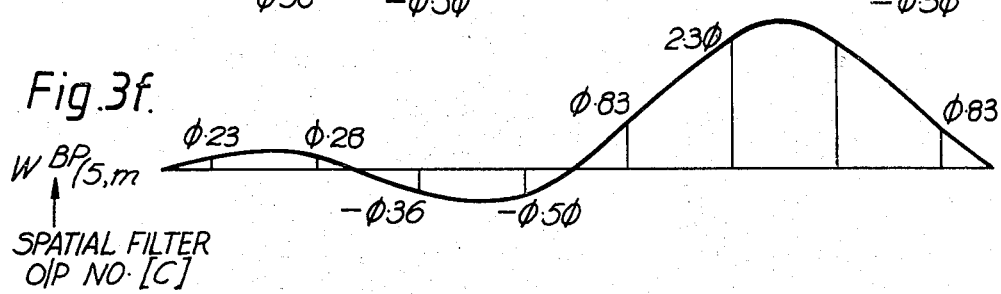

In the basic receiver system shown in FIG. 1, conventional multi-channel processing is assumed from R.F. through zero—I.F. stages in block 10 of the analog-to-digital converter 11 where simultaneous samples of phase and amplitude of all n channels are taken and made available to the digital signal processor 12.

FIG. 2 illustrates the basic structure employed and the basic function to be performed in the digital signal processor 12. Doppler processor 13 in addition to the angular processing described in the present application, is included by way of example.

Doppler filtering is performed in 13 independently on each channel preferably using conventional fast Fourier tansforms (FFT), to improve a signal-to-noise ratio and obtain a velocity estimate. The output with the largest response (most responsive channel) is taken as the Doppler cell in which maximum coherence occurs and the corresponding Doppler cell is taken for each channel's FFT determination. It is necessary to investigate coherence in more than one channel since, in the low-angle tackling situation, any one channel may be completely nulled due to random antiphase combination of direct and multiphath signals.

A salient feature of the present invention is the spatial filtering operation in 14. It is a linear process and is implemented by a matrix operation M yielding plural outputs, each with a different effective phase center spanning, as far as possible, the original extent of the antenna aperture. This process is known in a general way, a simple example of the technique being that provided by the first rank of a process described by Davies, D.E.N. "Independent Angular Steering of each zero of the directional pattern for a linear array," I.E.E.E. Transactions, Antennas and Propagation Vol. AP-15, pp-298, March 1967. In that paper, apparatus is described for generating independently steerable nulls from a cascade of network combinations. It should be noted however, that the means described in that prior art reference are not directed at the spatial filtering concept described herein.

Signals arriving at the n elements of a linear array are combined such that n-1 outputs are produced, each being the result of the vectorial addition of two adjacent inputs, one of which has been phase-shifted by $\mu$ radians. In this case, M has the form:

$$M = \begin{bmatrix} 1 & e^{ju} & 0 & 0 & 0 & \ldots & 0 & 0 \\ 0 & 1 & e^{ju} & 0 & 0 & \ldots & 0 & 0 \\ 0 & 0 & 1 & e^{ju} & 0 & \ldots & 0 & 0 \\ \vdots & & & & & & & \vdots \\ 0 & 0 & & & & \ldots & 1 & \cdot \end{bmatrix}$$

The span of phase centers at the output is $n-1/n$ times the original aperture. A null directed at an interfering signal attenuates the signal's contribution in all the collimated beams which may be formed for the tracking function. In antenna terms, we can consider that the spatial filter outputs represent a linear array of elements each having an angular response given by the product of the element pattern in the "real" array $E(\theta)$ and the modification $m(O)$ provided by the spatial filtering. Subsequent formation of collimated beams can be viewed as providing net directional responses $D_1(\theta)$, $D_2(\theta)$ etc. given by the product of the modified element patterns and the various array factors $A_1(\theta)$, $A_2(\theta)$ etc., that is:

$$D_r(\theta) = E(\theta) . m(\theta) . A_r(\theta)$$

As $A(\theta)$ is scanned, $m(\theta)$ retains control of the null directed at the interfacing signal so that all directional patterns so formed are automatically protected from that signal.

Figure 4A:
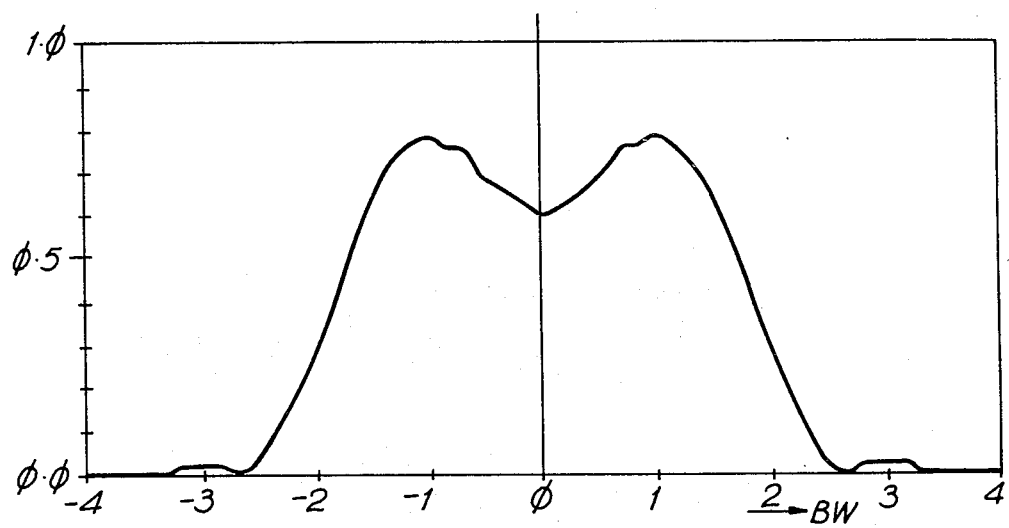
FIGS. 4A and 4B illustrate sectional power patterns of exemplified band-pass spatial filter outputs.
Figure 4B:
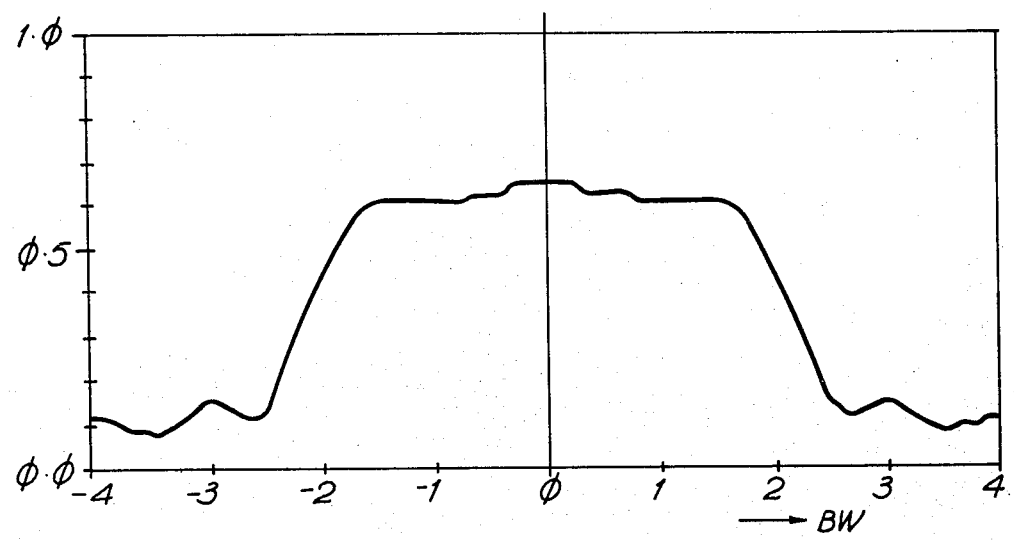

Use of such a simple matrix does not provide the degree of directivity required for the low-angle tracking function, however. Within the general spatial filtering concept, the use of two specific filtering algorithms is considered to be particularly important. The first is analogous to a band-pass frequency filter and attenuates signals arriving outside preset angular limits. For this filter the weights can take the following forms:

$$[m_{kl}]_{band-pass} = \frac{\sin\left[\frac{\pi P}{n}(l-k)\right]}{\frac{\pi P}{n}(l-k)} \cdot \exp\left[j\frac{2\pi Q}{n}(l-k-\tfrac{1}{2})\right] \quad \text{eqn. (1)}$$

or $$[m_{kl}]_{band-pass} = \frac{\sin\left[\frac{\pi P}{n}(l-k-\tfrac{1}{2})\right]}{\frac{\pi P}{n}(l-k-\tfrac{1}{2})} \cdot \exp\left[j\frac{2\pi Q}{n}(l-k-\tfrac{1}{2})\right] \quad \text{eqn. (2)}$$

where P is the pass-band (between −6 dB points in standard beamwidths of the array aperture) and the midband is at an angle Q in beamwidths relative to the boresight of the antenna. l runs from 1 to n and, for weights defined by equation (1), k runs from $1 + \tfrac{1}{2}$ m) to $\tfrac{1}{2}$ (n+m−1) assuming n and m to be even. For weights described by equation (2), k runs from $\tfrac{1}{2}$ (n−m+1) to $\tfrac{1}{2}$ (n+m−1). n is the number of array elements and m is the number of outputs provided by the spatial filter. The resultant weightings for an 8-element array (FIG. 3a) where Q=0 BW for m=5 (and from equation (2)) are shown in FIGS. 3b through 3f. Typical modified element output responses are shown in FIGS. 4(a), for the 3rd (central) filter output and 4(b) for the 0th and 6th (outermost) filter outputs. These last two outputs would not normally be used owing to inferior residual responses in the bandstop regions.

A second set of weights produces a narrow spatial notch which heavily attenutates signals arriving from one particular angle. The weights for the central output of the matrix required to direct the notch at an angle 0 (BW) with respect to boresight are related to the Hilbert series and are given by $$(m_l)_{notch} = \frac{\exp\left(j\frac{2\pi\theta}{n}[l-\tfrac{1}{2}(n+1)]\right)}{2[l-\tfrac{1}{2}(n+1)]}$$

(where n is the number of array elements, e.g. for 8 elements, weights of the form:

$$\tfrac{1}{7}e^{j7u}, \tfrac{1}{5}e^{j5u}, \tfrac{1}{3}e^{j3u}, e^{ju}, e^{-ju}, \tfrac{1}{3}e^{-j3u}, \tfrac{1}{5}e^{-j5u}, \tfrac{1}{7}e^{-j7u}$$

are produced.

The weighting for the non-central outputs are the result of shifting the above prototype weighting to the right (or left) of the aperture centerline first and then forcing a balance of the 'negative' and 'positive' weightings so that the net output from a signal at 0 is still zero. In the case of a boresight null, the following matrix giving 5 outputs illustrates the method:

$$M = \begin{bmatrix} -\frac{1}{3b} & -\frac{1}{b} & b & \frac{b}{3} & \frac{b}{5} & \frac{b}{7} & \frac{b}{9} & \frac{b}{11} \\ -\frac{1}{5a} & -\frac{1}{3a} & -\frac{1}{a} & a & \frac{a}{3} & \frac{a}{5} & \frac{a}{7} & \frac{a}{9} \\ -\frac{1}{7} & -\frac{1}{5} & -\frac{1}{3} & -1 & 1 & \frac{1}{3} & \frac{1}{5} & \frac{1}{7} \\ -\frac{a}{9} & -\frac{a}{7} & -\frac{a}{5} & -\frac{a}{3} & -a & \frac{1}{a} & \frac{1}{3a} & \frac{1}{5a} \\ -\frac{b}{11} & -\frac{b}{9} & -\frac{b}{7} & -\frac{b}{5} & -\frac{b}{3} & -b & \frac{1}{b} & \frac{1}{3b} \end{bmatrix}$$

The coefficients a and b are adjusted to satisfy the null response condition, from which:

$$a^2 = \frac{1 + \tfrac{1}{3} + \tfrac{1}{5}}{1 + \tfrac{1}{3} + \tfrac{1}{5} + \tfrac{1}{7} + \tfrac{1}{9}} \quad \text{and}$$

$$b^2 = \frac{1 + \tfrac{1}{3}}{1 + \tfrac{1}{3} + \tfrac{1}{5} + \tfrac{1}{7} + \tfrac{1}{9} + \tfrac{1}{11}}$$

The various angular responses associated with this matrix are shown in FIG. 5. The resonses are sufficiently similar to consider that, with the outputs formed into a scanning collimated beam, the net response is the procuct of the average of the patterns and the scanning array factor.

Figure 6:
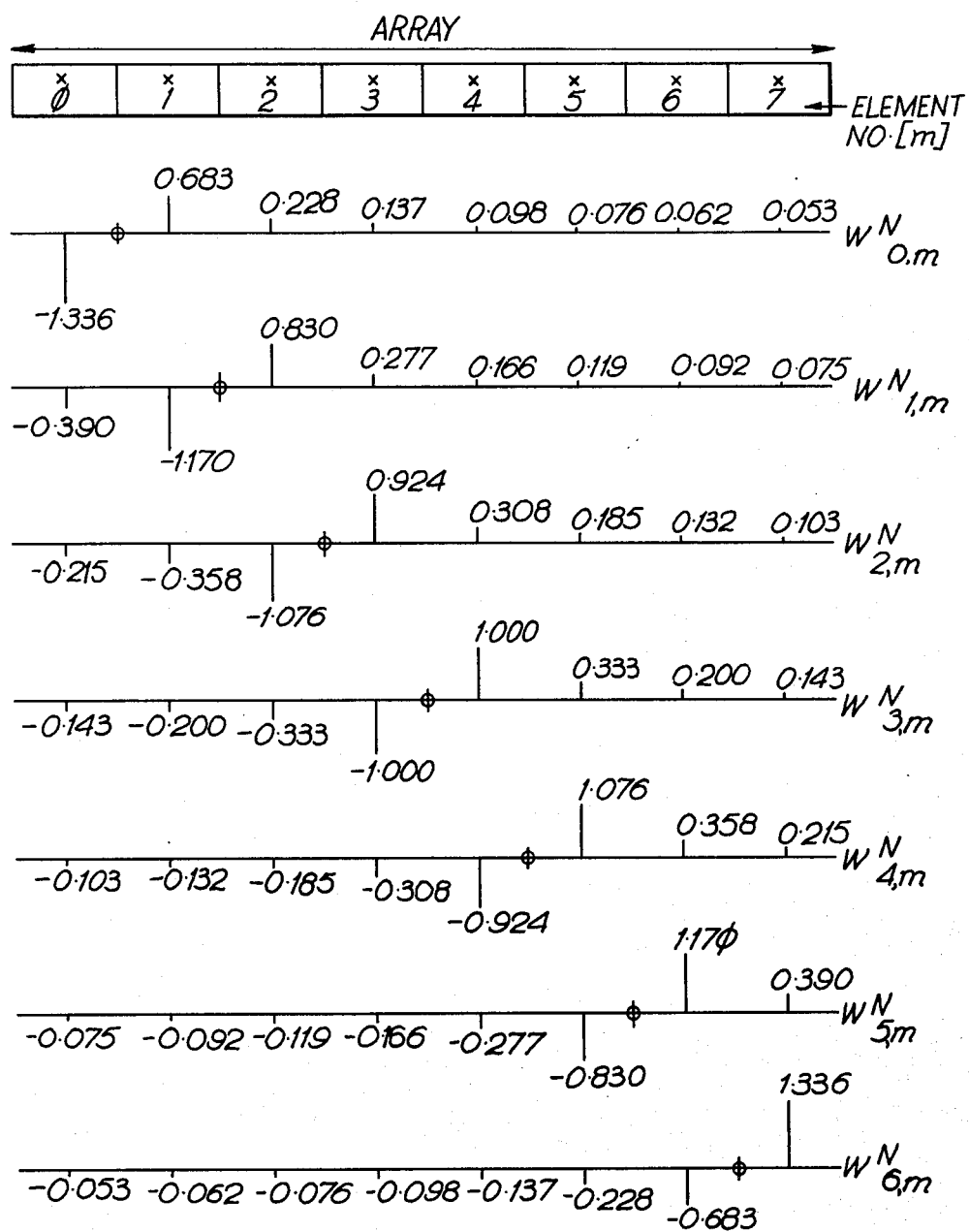
FIG. 6 illustrates weightings for a notch spatial filter centered at antenna boresight.

Additional scaling may be applied to the various matrix rows such that the sum of the squares of the weight moduli for the various rows are the same. FIG. 6 shows the weights used for obtaining 7 outputs all directing a null at boresight, with the scaling described above applied.

Using either of the above forms of spatial filtering, the filter outputs are then fed into a multiple beamformer 15. This is conveniently implemented in digital form by an FFT whose outputs represent the sum of all the inputs after applications of different incremental phase gradients.

Following the beam-former, there is a tracker 16 which scans the beam-former outputs for maximum response (corresponding to maximum coherence). Knowing the particular beam-former output with the maximum response enables the incremental phase gradient (applied to the beam-former inputs) to be identified and hence the angle of arrival of the original target signal. The resolution of the beam-former at this stage is limited to N/M BW (where BW is beamwidth angle, N=number of inputs and M=the number of points in the FFT) which corresponds to the phase quantization steps of the FFT. However, simple 2nd order interpolation on two points around the maximum response of the beam-former output and the maximum itself can resolve well below this quantization limit. Experimentally, a 4N point FFT followed by this interpolation has been found to be satisfactory.

It has been found that the direct-to-multipath signal ration, and not merely the absolute direct signal strength, governs the stability or lack of it for a low-angle tracking system. Thus, to use the band-pass spatial filter optimally in this situation it should be set with its −6dB cut-off point at approximately the lowest expected angle of arrival of targets. Although in this position the filter obviously attenuates the direct signal, it imparts significantly more attenuation to the multipath image signal giving a direct/multipath signal ratio which is higher than if the filter cut-off point were set at the horizon where the direct signal would be well in the filter pass-band, but the corresponding multipath signal would then be into the transition region.

In addition, it will be found that the outer outputs from the band-pass spatial filter exhibit a less effective response pattern. Increased multipath rejection and consequently improved tracking stability can be obtained by amplitude tapering the band-pass spatial filter outputs prior to beam-forming, giving less weight to the outer ones.

The main advantage of the pass-band spatial filter is that signals arriving at all angles below the horizon are attenuated. It would thus be extremely valuable in situations of diffuse multipath, targets at completely unknown elevations, or even in multiple-target, low-angle situations.

To use the notch filter in a low-angle tracking radar situation, it is necessary to steer the notch fairly precisely onto the arrival angle of the multipath image. It is thus not going to be of much value when it is required to track targets of completely unknown elevations or in the presence of diffuse multipath. The main advantage of the notch spatial filter, however, is the high order of attenuation it provides and the rapidity of its recovery to fill pass-band. This would make it ideal for use in the ultra-low-angle tracking situation where the multipath image is likely to be specular and the separation between direct and multipath signals could be less than 0.3BW.

It may be possible to initially employ the robust band-pass spatial filter in an initial tracking mode to access the target position approximately and then change to the notch spatial filter to provide optimum tracking of the lowest angle target. Whether this solution is practical largely depends on the speed of the digital signal processor in relation to the closing speed of the target.

The use of the spatial filtering technique does not preclude the possibility of tracking multiple targets since multi-channel capability is preserved to the point of beam-forming.

The spatial filter algorithms described above illustrate the beneficial use of rectangular and notch response characteristics. To be considered included in the scope of this invention are refinements to the algorithms which may for instance reduce the side lobe response of the rectangular filter or marginally broaden the stop band of the notch filter matrix.

The technique has been described in terms of a radar tracking system, but it is also applicable to surveillance radars, and to direction-finding systems.

Figure 7:
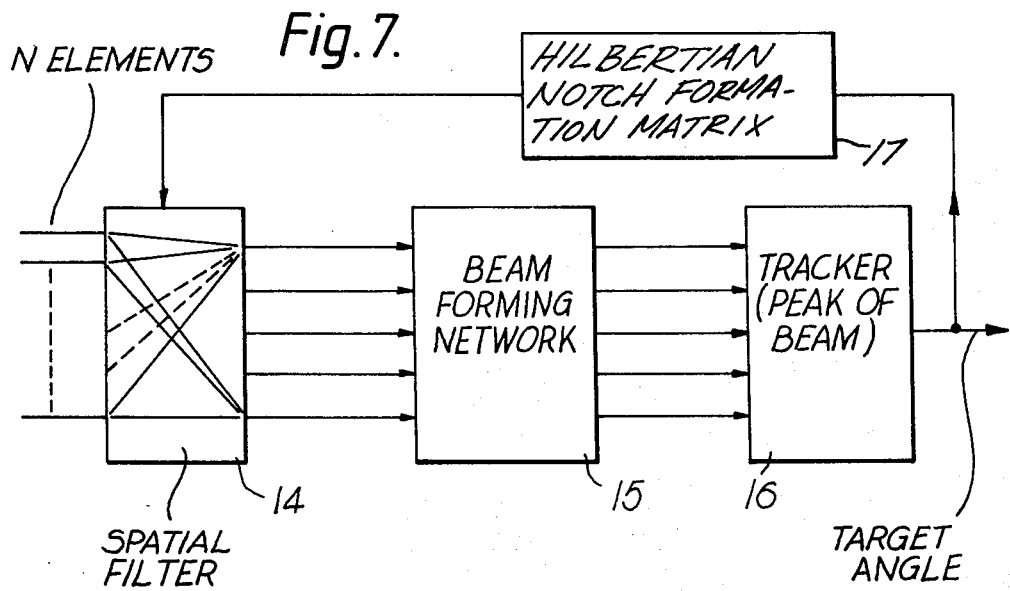
FIG. 7 illustrates a modification of the system shown in FIGS. 1 and 2.
Figure 8:
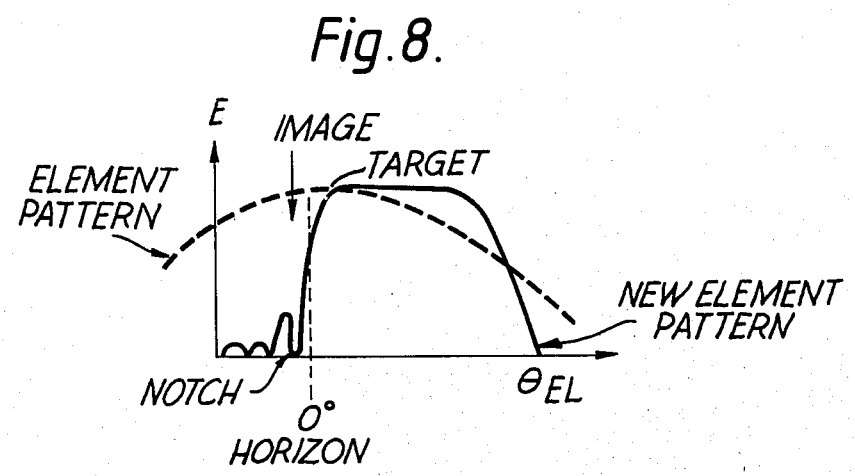
FIG. 8 illustrates the effect of cascading the notch filter with the band-pass filter.

In a modification of the invention, shown in FIG. 7 an initial estimate in 17 of the elevation is made by the system using the spatial filter 14 in a band-pass filter mode only. A narrow notch filter mode is then formed in cascade with the band-pass filter, using the Hilbertian notch formation method described above. This notch then reduces the level of multipath signals reaching the beam-former 15 and tracker 16. If desired, a new estimate of the target elevation may then be made and the notch adjusted, and so on, in an adaptive manner.

Clearly there will be a limit on the lowest angle at which the notch can be used before unacceptable loss of target signal strength occurs, but other work on notch steering leads us to believe this to be around $\frac{1}{4}$ to $\frac{1}{2}$ of a standard beamwidth separation or, in terms of elevation angle $\frac{1}{8}$ to $\frac{1}{4}$ beamwidths. There will, of course, be an inevitable compromise in deciding the sharpness of the null which will be at the expense of a sharp band-pass characteristic.

In a modification of the invention the n elements of the array can be first divided into groups, the elements within each group or "sub-array" being weighted and then summed. The outputs of these sub-arrays are subsequently digitized and then digitally processed in the manner described above. The sub-arrays may be non-overlapping or overlapping. Overlapping may be described to reduce grating lobe effects.

In one embodiment, the antenna array is coupled to an R.F. or I.F. multiple beam-former, the various beam outputs then being digitized and retransformed in the digital processor to reconstruct, at least approximately, the original array aperture distribution before applying the digital processing as previously described.

What is claimed is:

1. A phased array radar system comprising:
   first means for converting multi-channel analog information signals with zero intermediate frequency to digital representations thereof;
   second means comprising multi-channel digital filtering means responsive to said first means for obtaining angular discrimination wherein filtering is implemented in parallel on all the channels by a matrix operation according to one or more predetermined algorithms yielding a plurality of outputs each with a different effective pulse center spanning substantially the original extent of the antenna aperture;
   beam-forming means to which said second means outputs are applied;
   and signal processing means to which the outputs of the beam-forming means are applied to yield an output representative of target angle.

2. A system according to claim 1 wherein said multi-channel digital filtering is effected according to the algorithm $$[m_{kl}]_{band\text{-}pass} = \frac{\sin\left[\frac{\pi P}{n}(l-k)\right]}{\frac{\pi P}{n}(-k)}.$$

-continued $$\exp\left[j\frac{2\pi Q}{n}(l-k-\tfrac{1}{2})\right]$$

or $$[m_{kl}]_{band\text{-}pass} = \frac{\sin\left[\frac{\pi P}{n}(l-k-\tfrac{1}{2})\right]}{\frac{\pi P}{n}(l-k-\tfrac{1}{2})} \cdot \exp\left[j\frac{2\pi Q}{n}(l-k-\tfrac{1}{2})\right]$$

where P is the pass-band (between −6dB points) in standard beamwidths of the array aperture, the midband is at an angle Q beamwidths relative to the boresight of the antenna, n is the number of array elements, m is the number of outputs provided by the filtering means, runs from 1 to n, and k runs from $1+\tfrac{1}{2}(n-m)$ to $\tfrac{1}{2}(n+m)$ or from $\tfrac{1}{2}(n-m+1)$ to $\tfrac{1}{2}(n+m-1)$ respectively.

3. A system according to claim 1 wherein said multi-channel filtering is effected according to the algorithm $$m_{l\,notch} = \frac{\exp\left\{j\frac{2\pi\theta}{n}[l-\tfrac{1}{2}](n+1)\right\}}{2l-\tfrac{1}{2}(n+1)}$$

where n is the number of arrary elements.

4. A system according to claim 1 wherein digital filtering is first effected according to the algorithm set forth in claim 2 and then according to the algorithm set forth in claim 3.

5. A system according to claim 1, 2 or 3 including means for estimating the angle of reception at the array of desired signals, and means for modifying the value in the digital filter algorithm in accordance with said estimated angle.

6. A system according to claims 1, 2, 3, 4 or 5 in which the array elements are divided into groups, the outputs of the elements within each group are weighted according to a predetermined pattern, the weighted outputs are summed and the summed outputs are digitized before being applied to the multi-channel digital filtering means.

7. A system according to claim 6 wherein said groups are overlapping.

8. A system according to claims 1, 2, 3, 4 or 5 wherein the array outputs are coupled to an R.F. or I.F. multiple beam-former and the various beam outputs of which are digitized and retransformed to reconstruct at least approximately the original array aperture distribution before being applied to the multi-channel digital filtering means.

* * * * *